(12) United States Patent
Zhang et al.

(10) Patent No.: US 7,226,255 B2
(45) Date of Patent: Jun. 5, 2007

(54) FIVE-SIMULTANEOUSLY-WORKING-AXIS COMPUTERIZED NUMERICAL CONTROLLED TOOTH CUTTING MACHINE TOOL FOR PLANE ENVELOPING TOROIDAL WORMS

(75) Inventors: Yaxiong Zhang, Tianjin (CN); Lin Qi, Tianjin (CN)

(73) Assignees: Tianjin Teda Development Centre for Worm Gear Transmission, Tianjin (CN); Tsubaki Emerson Gear (Tianjin) Co., Ltd., Tianjin (CN)

( * ) Notice: Subject to any disclaimer, the term of this patent is extended or adjusted under 35 U.S.C. 154(b) by 306 days.

(21) Appl. No.: 10/984,156

(22) Filed: Nov. 9, 2004

(65) Prior Publication Data
US 2005/0117985 A1   Jun. 2, 2005

Related U.S. Application Data

(63) Continuation-in-part of application No. 10/331,450, filed on Dec. 27, 2002, now abandoned.

(30) Foreign Application Priority Data
Oct. 31, 2002   (CN) ............................... 02 2 82433

(51) Int. Cl.
   *B23F 13/00*   (2006.01)
(52) U.S. Cl. .............................. 409/48; 409/2; 409/51
(58) Field of Classification Search .................. 409/48, 409/1, 12, 11, 17, 18, 20, 24, 38–39, 2, 41, 409/50, 51; 82/131, 156; 29/27 R, 27 C; 451/47, 147, 161, 219, 275
See application file for complete search history.

(56) References Cited

U.S. PATENT DOCUMENTS 3,561,321 A * 2/1971 Belshaw et al. ............... 409/5

4,785,525 A * 11/1988 Ishida et al. .................. 483/18

(Continued)

FOREIGN PATENT DOCUMENTS

JP    ZL92204765.0    10/1992
JP    2001-198702 A  *  7/2001

*Primary Examiner*—Erica Cadugan
(74) *Attorney, Agent, or Firm*—Milde & Hoffberg, LLP (57) ABSTRACT

The present invention provides a five-simultaneously-working axis computerized numerical controlling system tooth cutting machine tool for toroidal worms, comprising two parts a body of the machine tool and a controlling cabinet. The body comprises a bed, a spindle box with a spindle, a longitudinal sliding table, a traverse slider, a vertical guideway mounted on the slider and a tailstock, a cutter rest that supports a rotating cutter head is mounted on the vertical guideway. The spindle rotates about A-axis thereof, the table longitudinally slides along Y-axis relative to the bed, the cutter head rotates about B-axis thereof and transversely shifts X-axis as well as the cutter head makes up or down shift along Z-axis of the vertical guideway. The controlling cabinet is equipped with the programs for controlling spindle rotation and for controlling the shifting along longitudinal, transverse and vertical directions as well as the rotation of the cutter head so as to make the rotation about or the shifts along five axes of A, B, Y, X and Z have simultaneously work together to control the shifting of the cutting edges of the cutter on the cutter head and simulate the rotating motion of an inclined plane in space in order to envelop cut the tooth flanks of plane enveloping toroidal worms. The effect of this invention shows that the rotating speed of cutter shaft and workpiece shaft can make the cutting velocity up to 200 m/min, and the working efficiency is six to seven times higher than that of worm grinding, the productivity can greatly be improved.

9 Claims, 7 Drawing Sheets

U.S. PATENT DOCUMENTS

| | | | |
|---|---|---|---|
| 5,634,250 A * | 6/1997 | Mihailovic | 29/26 A |
| 5,882,154 A * | 3/1999 | Mihara et al. | 409/9 |
| 6,056,487 A * | 5/2000 | Brehmer et al. | 409/12 |
| 6,185,818 B1 * | 2/2001 | Ito et al. | 29/889.7 |
| 6,618,917 B2 * | 9/2003 | Sugiura et al. | 29/27 C |
| 6,916,140 B2 * | 7/2005 | Fleytman | 409/48 |
| 2003/0041706 A1 * | 3/2003 | Sugiura et al. | 82/1.11 |

* cited by examiner

FIVE-SIMULTANEOUSLY-WORKING-AXIS COMPUTERIZED NUMERICAL CONTROLLED TOOTH CUTTING MACHINE TOOL FOR PLANE ENVELOPING TOROIDAL WORMS

CROSS-REFERENCE TO RELATED APPLICATION

This application is a continuation-in-part of application Ser. No. 10/331,450, filed Dec. 27, 2002 entitled "FIVE-SIMULTANEOUSLY-WORKING-AXIS COMPUTERIZED NUMERICAL CONTROLLED TOOTH CUTTING MACHINE TOOL FOR PLANE ENVELOPING TOROIDAL WORMS", now abandoned.

FIELD OF THE INVENTION

The present invention relates to five-simultaneously-working-axis Computerized Numerical Control (CNC) tooth-cutting machine tools for plane enveloping toroidal worms.

BACKGROUND OF THE INVENTION

Some existing toroidal worm grinding equipment have been developed recently, such as German HNC 35 TP and the Chinese Patent No. ZL92204765.0 patent entitled "Four-simultaneously-working-axis computerized numerical controlled toroidal worm grinding machines". This equipment has such advantages that the thread of plane enveloping toroidal worms can accurately be formed in once grinding; the ground workpieces can acquire high accuracy and perfect surface roughness. However, their deficiencies are low productiveness and expensive machining cost, so that it results in very high cost of the machined workpieces and cannot meet the needs of constantly developing production.

The technical problem to be solved by this invention is to provide a sort of five-simultaneously-working-axis CNC tooth-cutting machine tools for accurately forming plane enveloping toroidal worms in order to improve the productivity and reduce the cost.

In order to solve the above technical problem the technical scheme adopted by this invention is to provide a five-simultaneously-working-axis computerized numerical controlled tooth-cutting machine tool for plane enveloping toroidal worms, comprising a body of the machine tool and a controlling cabinet. The body comprises a bed, a spindle box with a spindle, a longitudinal sliding table, a vertical guideway, a traverse slider and a tailstock, a cutter rest that supports a rotating cutter head is mounted on the vertical guideway, the spindle rotates about A-axis thereof, the table longitudinally slides along Y-axis relative-to the bed, the cutter head rotates about B-axis thereof and transversely shifts along X-axis, as well as the cutter head makes up or down shift along Z-axis of the vertical guideway. The controlling cabinet is equipped with programs for controlling the five axes of A, Y, X, Z and B to simultaneously work together, wherein a first coordinate system $\Sigma_1$ is connected with the workpiece, a second coordinate system $\Sigma_2$ is connected with an imaginary gear, a third coordinate system $\Sigma_3$ is connected with the rotating cutter head and a four coordinate system $\Sigma_4$ is connected with the cutting edges, based upon the operating transformation of the coordinate systems, the motion equations of the five axes of the machine tool are determined so that the shift of the cutting edges of the cutter on the cutter head is controlled to simulate an inclined plane in spatial locations in order to envelop cut the tooth flanks of plane enveloping toroidal worms.

Perfectly, the inclined plane simulated by the cutting edges of the cutters rotates around the central axis of the imaginary gear $k_2(o_2)$, i.e. the composition of both the rotation of B-axis and the revolution of B-axis around the axis of $k_2(o_2)$, at the same time the workpiece rotates around $J_1(o_1)$ (i.e. A-axis), in the course of relative motions the tooth flank of plane enveloping toroidal worm is generated.

Perfectly, the tooth forming motion of plane enveloping toroidal worm can correctly be controlled by means of controlling the values of a rotating angle $\phi$, of the workpiece rotating around $j_1(o_1)$-axis, a rotating angle $\phi_2$ of the imaginary gear rotating around $k_2$ $(o_2)$-axis, a rotating angle $\phi$, of the cutter head rotating around $k_3$ $(o_3)$-axis, the included angle $\tau$ between the radius vector $r$ and the coordinate axis $j_2(o_2)$ while the center $o_3$ of the cutter head rotating around the center $o_2$ of the imaginary gear and a distance $h$ of the center $o_2$ of the imaginary gear making straight-line shift along thereof central axis $k_2$ $(o_2)$-axis to point $o_5$, in which $\phi_1/\phi_2$ is equal to the gear ratio between the machined worm and the imaginary gear.

Perfectly, there are at least two blades mounted on the rotating cutter head, the cutting edges of the blades are of straight line which lies on the plane perpendicular to the axis of the rotating cutter head.

Perfectly, the cutter edges are all located on two tooth planes of the imaginary gear; while two tooth planes are inclined with an angle $\beta$ with respect to the central axis of the imaginary, gear and tangential to two imaginary spatial cones respectively; the half conic angles of two cones are equal to the inclined angle $\beta$, the radius $r_b$ of said imaginary cones is equal to the radius $r_{bt}$ of the main basic circle of the imaginary gear, the cutting edges on the cutter head shift along the tooth plane imaginary gear; while the inclined plane is tangential to the spatial cone and rotates around the central axis $k_2(o_2)$ of the cone; the center o2 of the imaginary gear makes up or down shift along the vertical axis $k_2(\phi_2)$, the cutting edge comes into cutting at point N and secedes from cutting at point S, the coordinates of every point on the workpiece make following-up motions along X-, Y-and Z-axes while B-axis, makes the circular-arc interpolating motion around the central axis $k_2(o_2)$ of the imaginary gear. In other words, the resultant motion of shifts along X-, and Y-axes, is equivalent to the revolution of B-axis around the central axis $k_2(o_2)$ of the imaginary gear.

Perfectly, the spindle box and the tailstock are fixed on the longitudinal sliding table that is movably mounted on the bed, and the traverse slider is mounted on the bed.

The effect of the machine tool is that the rotating speed of cutter shaft and workpiece shaft can make the cutting velocity up to 200 m/min, thus the working efficiency is six to seven times higher than that of worm grinding and the productivity can greatly be improved. The machine tool of the present invention is to supplement the deficiency of toroidal worm grinding machines and to provide a sort of high-productivity tooth cutting machine tools.

BRIEF DESCRIPTION OF THE ATTACHED DRAWINGS

FIG. 8(1) represents the motion state of cutter when h=0;

FIG. 8(2) represents the motion state of cutter when h<0;

FIG. 8(3) represents the motion state of cutter when h>0;

DETAILED DESCRIPTION OF THE PREFERRED EMBODIMENTS

By referring to the attached drawings and embodiment, the technical scheme of the present invention would further be expounded as follows.

Figure 1:
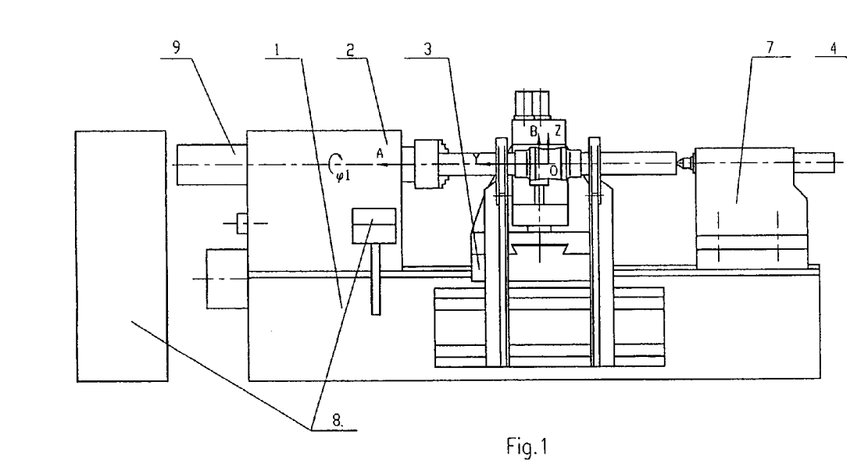
FIG. 1 is the diagrammatic sketch of the structure of five-simultaneously-working-axis computerized numerical controlled tooth-cutting machine tools for plane enveloping toroidal worms.
Figure 2:
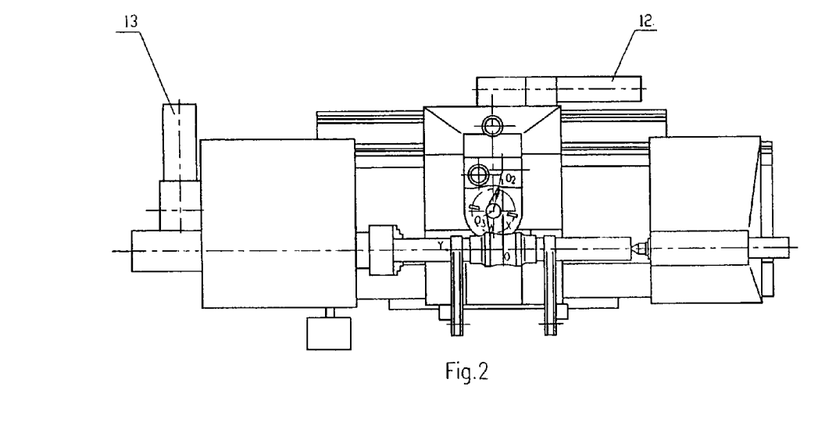
FIG. 2 shows the top view of FIG. 1.
Figure 3:
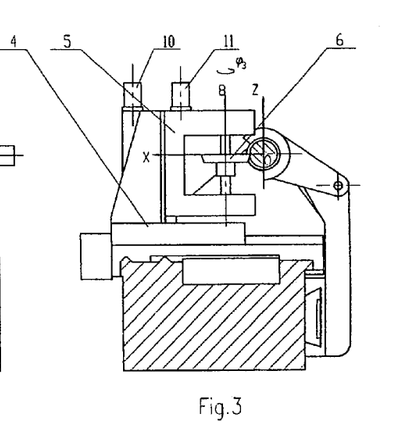
FIG. 3 is the side elevation of FIG. 1.

As shown in FIGS. 1, 2 and 3, the first embodiment of a five-simultaneously-working-axis computerized numerical controlled tooth-cutting machine tool for plane enveloping toroidal worms of this invention, comprising a body of the machine tool and a controlling cabinet. The body comprises a bed 1, a spindle box 2 with a spindle, a longitudinal sliding table 3, a vertical guideway, a traverse slider 4 and a tailstock 7 as well as a cutter rest 5. The spindle box 2 and the tailstock 7 are mounted on said bed 1. The workpiece is held between the spindle of the spindle box 2 and the tailstock 7. The longitudinal sliding table 3 is movably mounted on said bed 1. The traverse slider 4 is mounted on the longitudinal sliding table 3. Said vertical guideway is mounted on said traverse slider 4. A cutter rest 5 is mounted on the vertical guideway for supporting a rotating cutter head 6. The rotating cutter head 6 is mounted on the cutter rest 5 and can rotate about B-axis by a driving servomotor 11. There are two blades at least are mounted on the rotating cutter head 6. The edge form of the blade is of a straight line, which lies on the plane perpendicular to the axis of the rotating cutter head. The adjustment structure of the cutter rest 5 for supporting the rotating cutter head 6 comprises a servomotor 10 and a set of lead screw-nut mechanism. By means of the servomotor 10 and said lead screw-nut mechanism, the rotating cutter head 6 can make up or down shift along Z-axis.

The main motions of this machine tool include: the rotating motion of the spindle rotating about A-axis thereof; the longitudinal sliding movement of the table 3 along Y-axis relative to the bed shifts; the rotating motion of the cutter head 6 rotating around B-axis thereof; the transverse movement of the cutter head 6 shifting along X-axis and the movement of the cutter head 6 shifting up or down along Z-axis of the vertical guideway. Thus the workpiece rotates about A-axis and the cutter head 6 rotates about B-axis at given speed, transversely shifts along X-axis and upwards or downwards shifts along Z-axis as well as longitudinally shifts along Y-axis relative to the workpiece mounted between the spindle of the spindle box 2 and the tailstock 7.

The controlling cabinet is equipped with the programs for controlling spindle rotation and for controlling the shifting along longitudinal, transverse and vertical directions as well as the rotation of the cutter head so as to make the rotation about or the shifts along five axes of A, B, Y, X and Z simultaneously work together to control the shifting of the cutting edges of the cutter head 6 relatively to the workpiece to simulate the rotating motion of an inclined plane in space in order to envelop cut the tooth flanks of plane enveloping toroidal worms. Therefore the thread of plane enveloping toroidal worms would be formed. The speed of the spindle can automatically be adjusted according to the size of workpiece to keep the constant cutting velocity.

In order to improve the productivity of tooth cutting, a vertical guideway is mounted on the traverse slider 4. The cutter body is connected with the nut through the structure of a ball lead screw. The cutting edge of the cutter makes up or down shift along the guideway. The edge form of the blade is of straight line, which lies on the plane perpendicular to the axis of the rotating cutter head. The left cutting edge is tangential to an imaginary special circular cone, while the right cutting edge to another imaginary circular cone. The bases of these two cones are congruent with one another, while the vertexes of two cones are located in opposite positions. Five-axis-simultaneously-working makes the cutting edges of the cutter shift along an inclined plane and rotate around the, axis of the cone so as to generate the thread of worm.

Figure 4:
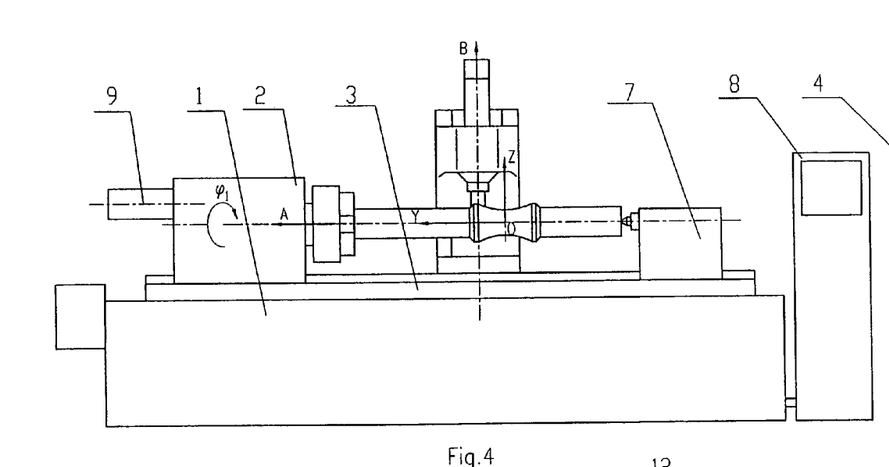
FIG. 4 is the diagrammatic sketch of another embodiment of five-simultaneously-working-axis computerized numerical controlled tooth-cutting machine tools for plane enveloping toroidal worms.
Figure 5:
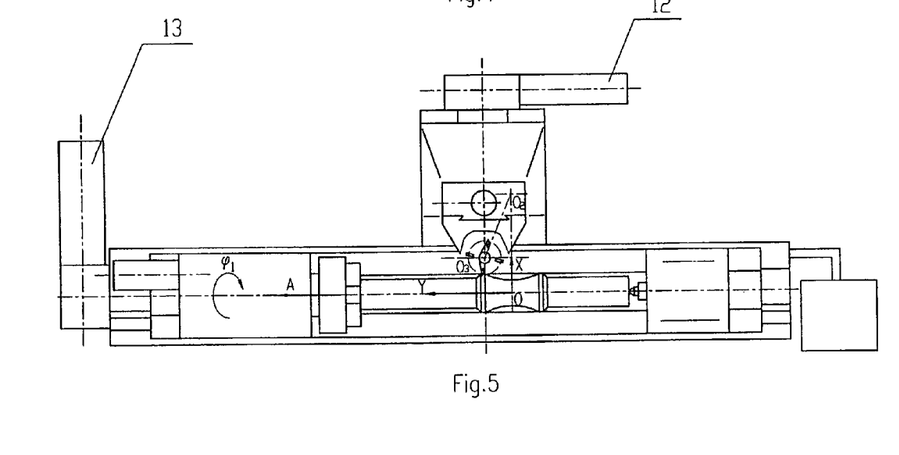
FIG. 5 is the top view of FIG. 4.
Figure 6:
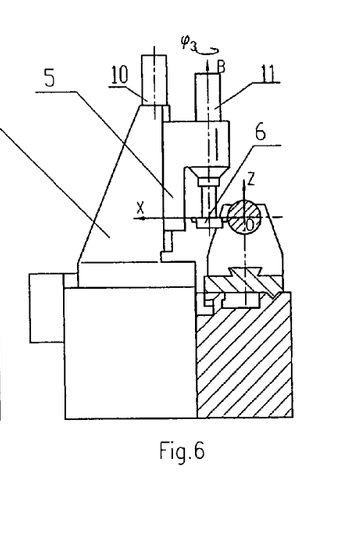
FIG. 6 is the side elevation of FIG. 4.

As shown in FIGS. 4, 5 and 6, the second embodiment of the five-simultaneously-working axis CNC tooth-cutting machine tools for plane enveloping toroidal worms in accordance with the invention will be described as follows, in which the same reference number indicates the same number as the first embodiment and the description for the same structure as the first embodiment will not be described herein.

The longitudinal sliding table 3 is mounted on said bed 1. Said spindle box 2 and said tailstock 7 are fixed on said longitudinal sliding table 3. The workpiece is mounted between spindle A and the tailstock 7. The spindle controls the rotation of the workpiece by using a servomotor 9. The longitudinal sliding table 3 makes the workpiece shift along Y-axis through a servomotor 13. The traverse slider 4 is mounted on said bed 1 and can feed along X-axis driven by a servomotor 12. The rotating cutter 6 is mounted on the cutter rest 5 located on the vertical guideway and can rotate around B-axis driven by a servomotor 11. The cutter rest is driven by a servomotor 10 through a set of lead screw-nut mechanism and makes the cutter head up or down shift along Z-axis. The rotating speed of A axis can automatically be adjusted according to the size of the workpiece to keep the constant cutting velocity. Thus the workpiece both rotates about A-axis and shifts along Y-axis, and the cutter head 6 rotates about B-axis with a given speed, transversely shifts along X-axis and upwards or downwards shifts along Z-axis.

Similarly, the programs being equipped within the controlling cabinet controls the spindle rotation and the shifting movements along longitudinal, transverse and vertical directions as well as the rotation of the cutter head so as to make the movements of rotating about or shifting along the five axes of A, Y, X, Z and B simultaneously work together to control the shifting of the cutter edges of the cutter blades of the cutter head 6 relatively to the workpiece to simulate an inclined plane in spatial locations in order to envelop out the tooth flanks of plane enveloping toroidal worms. Therefore the thread of plane enveloping toroidal worms would be formed.

Figure 7:
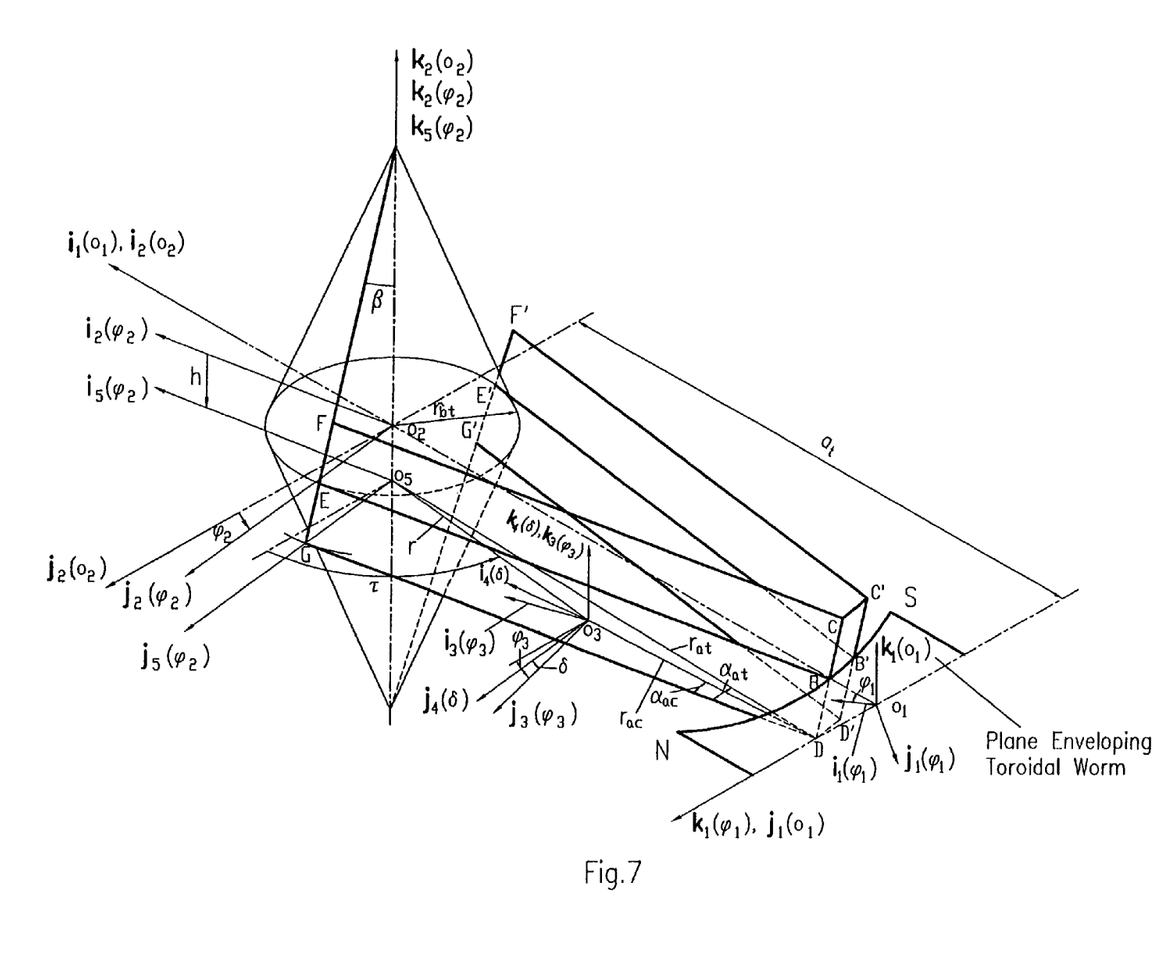
FIG. 7 shows the coordinate system.
Figure 8:
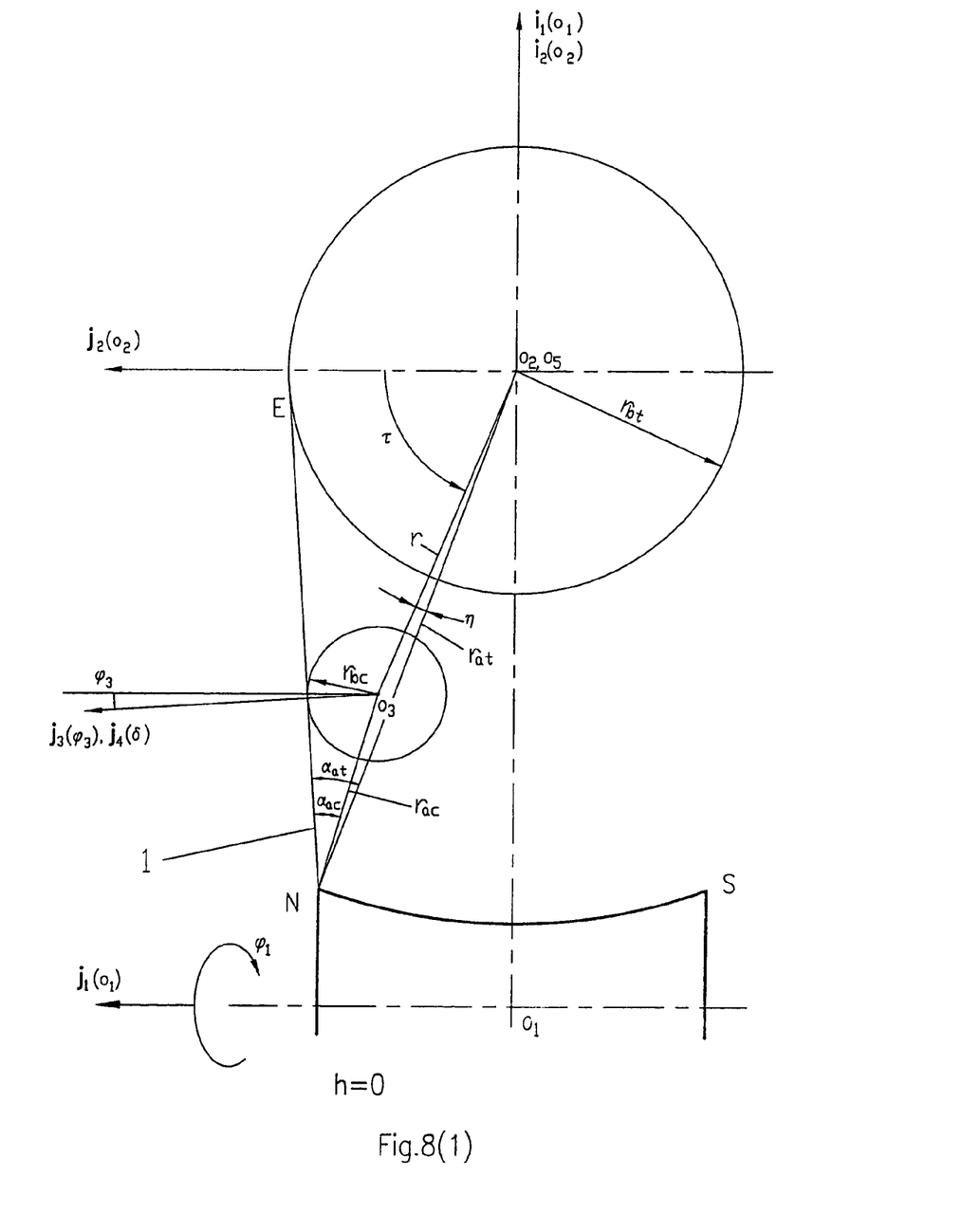

As shown in FIG. 7, under the generating motion of five-axis-simultaneously-working the cutting edge of the cutter would simulate a plane $\Sigma_2$, while $\Sigma_2$ rotates around $K_2$ ($o_2$) (i.e. the composition of both the rotation of B-axis and the revolution of B-axis around $K_2$ ($o_2$)), at the same time the toroidal worm (i.e. the workpiece) rotates around $J_1(o_1)$ (i.e. A-axis). In the course of relative motion the tooth flank of plane enveloping toroidal worm would be generated.

As shown in FIG. 7, a first coordinate system $\Sigma_1$: $\{o_1; i_1(o_1), j_1(o_1), k_1(o_1)\}$ is connected with the workpiece of worm; a second coordinate system $\Sigma_2$: $\{o_2; i_2(o_2), j_2(o_2), k_2(o_2)\}$ is connected with the spatial imaginary gear, $\widehat{BB}$ is the tip circle of the imaginary gear; a third coordinate system $\Sigma_3$: $\{o_3; i_3(\phi_3), j_3(\phi_3), k_3(\phi_3)\}$ is connected with the cutter head. The center $o_3$ of the cutter head rotates around the spatial imaginary gear $o_2$; a fourth coordinate system $\Sigma_4$: $\{i_4(\delta), j_4(\delta), k_4(\delta)\}$ is connected with the cutting edges. Assumed that quadrilateral $\square$ CDFG and quadrilaterals $\square$ C'D'F'G' are plane and express the tooth flank of the imaginary gear. Let the plane mesh with the thread of worm, it realizes the enveloping motion of the plane enveloping toroidal worm. This invention designs the cutting edge of a rotating cutter head that lies on the tooth flank of the imaginary gear. Let the cutting edge shifts on the plane. While two planes are tangential to two cones whose bases are congruent with one another and the vertexes of two cones are located in opposite positions. The half conic angle of the plane is $\beta_t$. The shift of cutting edge may envelop out the thread of plane enveloping toroidal worm.

As shown in FIG. 7, $o_5$ is the origin of the auxiliary coordinate system $\Sigma_5(\phi_2)$: $\{o_5; i_5(\phi_2), j_5(\phi_2), k_5(\phi_2)\}$, while $i_5(\phi_2), j_5(\phi_2), k_5(\phi_2)$ are the auxiliary coordinate system $\Sigma_5(\phi_2)$, respectively. The $k_5(\phi_2)$-axis is coaxial with the $k_2(\phi_2)$-axis. Point $o_5$ shifts along the $k_5(\phi_2)$-axis, the shifting distance depending upon the size of the machined worm. When the cutting edges of the cutter head make an up or down shift along the tooth flank C D G F of the imaginary gear, h is the distance from $o_2$ to $o_5$ along the axis of the imaginary gear; i.e., the $k_5(\phi_2)$-axis. If $o_5$ is located under $o_2$, h is less than zero; if $o_5$ is located above $o_2$, h is greater than zero.

As shown in FIG. 7, the meaning of five axes is expounded as follows.

1. A-axis: workpiece axis $j_1$ ($\phi_1$), the rotating angle $\phi_1$ of the workpiece.
2. B-axis: the rotating axis of the cutter head, i.e. $k_3$ ($\phi_3$) in FIG. 7, $\phi_3$ is the rotating angle of the cutter head.
3. X-axis: i.e. $i_1$ ($o_1$)-axis in FIG. 7, the traverse slider makes straight-line motion along x-direction.
4. Y-axis: i.e. $j_1$ ($o_1$)-axis in FIG. 7, the longitudinal sliding table makes straight-line motion along Y-direction.
5. Z-axis: i.e. $k_1$ ($o_1$)-axis in FIG. 7, the machine tool makes up or down shift along Z-axis.

FIG. 5 shows that the first coordinate system $\Sigma_1$: $\{o_1; i_1 (o_1), j_1 (o_1), k_1 (o_1)\}$ represents the workpiece; while the second coordinate system $\Sigma_2$: $\{o_2; i_2 (o_2), j_2 (o_2), k_2 (o_2)\}$ is connected with the imaginary tool gear. In order to expound point $o_5$, jet the coordinate, system $\Sigma_5(\phi_2)$: $\{o_5; i_5(\Phi_2), j_5(\Phi_2), k_5(\Phi_2)\}$ be connected with the main basic circle of the imaginary tool gear for the convenience of describing the motion of point $o_5$. When the point $o_5$ coincides with the point $o_2$, the coordinate system $\Sigma_5(\Phi_2)$ coincides with the coordinate system $\Sigma_2(\Phi_2)$. In this case h=0, the radius of the main basic circle of the imaginary gear is $r_{bt}$; if h≠0, the coordinate of the center $o_2$ of the imaginary gear will make straight-line shift along $k_2(o_2)$-axis to point $o_5$, at this moment $r_{at}$ is the radius of the outer circle of the imaginary gear; $r_{ac}$ is the radius of the tip circle of the cutter head. The digit 1 in FIG. 5 represents the cutting edge 1. $\overline{o_2o_5}$=h, h-value can take positive (refer to FIG. 5(3)), negative (refer to FIG. 5(2)) or zero.

The origin of the third coordinate system $\Sigma_3$ that is fixed with the cutter head is $o_3$. $o_3$ will rotates around the central axis $k_2(o_2)$ of the imaginary gear in the course of machining r represents the radius vector from the origin $o_5$ to the origin $o_3$. The angle included between the radius vector r and the axis $j_2(o_2)$ is expressed by $\tau$. Make the second coordinate system $\Sigma_2$: $\{o_2; i_2(o_2), j_2(o_2), k_2(o_2)\}$ representing the imaginary gear be directly related to the third coordinate system $\Sigma_3$: $\{o_3; i_3(\phi_3), j_3(\phi_3), k_3(\phi_3)\}$ for the cutter head by using the radius vector r and the polar angle $\tau$ in order conveniently to reveal the motion relationship between the rotating center $o_3$ of the cutter head and the moving point $o_5$. The shifting of the center $o_3$ of the cutter head can be described in the first coordinate system $\Sigma_1$: $\{o_1; i_1(o_1), j_1(o_1), k_1(o_1)\}$:

$$\left.\begin{array}{l} x_1(o_1) = a_t - r\sin\tau \\ y_1(o_1) = r\cos\tau \\ z_1(o_1) = h \end{array}\right\} \quad \text{Formula (1)}$$

$$r = \sqrt{r_{at}^2 - r_{ac}^2 - 2r_{at}r_{ac}\cos(\alpha_{at}-\alpha_{ac})} \quad \text{Formula (2)}$$

$$\tau = \Phi_3 + 90° - \alpha_{at} - \eta \quad \text{Formula (3)}$$

$$\alpha_{at} = \arcsin\left(\frac{r_{bt}}{r_{at}}\right) \quad \text{Formula (4)}$$

$$\alpha_{ac} = \arcsin\left(\frac{r_{bc}}{r_{ac}}\right) \quad \text{Formula (5)}$$

$$\eta = \arcsin\left(\frac{\sin(\alpha_{at}-\alpha_{ac}) \times r_{ac}}{r}\right) \quad \text{Formula (6)}$$

Where, $\alpha_{at}$—The pressure angle of the tip circle of the imaginary gear;

$\alpha_{ac}$—The pressure angle of the tip circle of the cutter head;

$r_{at}$—The radius of the outer circle of the imaginary gear;

$r_{ac}$—The radius of the tip circle of the rotating cutter head.

Point N in the figure is the cutting-in point; point S is the seceding point.

Through $\Delta O_2NO_3$ we can investigate the values of r and $\tau$ mentioned above.

Formulae (1), (2) and (3) determine the coordinates of the center $o_3$ of the cutter head and the imaginary gear in the course of simultaneous working. And it is not hard to find $\phi_3$.

(1) At Point N, $x_{1N}$ and $y_{1N}$ are known, for the cutting edge1, the rotating angle $\phi_3$ of the center $o_3$ of the cutter head is $$\phi_3 = \arctan\left(\frac{a_t - x_{1N}}{y_{1N}}\right) - (90° - \alpha_{at}). \quad \text{Formula (7)}$$

(2) At Point S, $x_{1S}$ and $y_{1S}$ are known, for the cutting edge 1, the rotating angle $\phi_3$ of the center $o_3$ of the cutter head is $$\phi_3 = \arctan\left(\frac{a_t - x_{1S}}{y_{1S}}\right) + (90° + \alpha_{at}). \quad \text{Formula (8)}$$

The above formulae (7) and (8) establish the spatial motion relationship of the workpiece and the cutter head. The cutting edge 1 comes into cutting at point N and secedes from cutting at point S. According to the same reason, the cutting rotating angles $\phi_3$ of the cutting edges 1, 2 and 3 can be found.

In FIG. 8(1) EN is the intersected line of the right tooth flank of the imaginary gear and the main plane. Assumed that EN is considered the cutting edge, when the workpiece rotates around $j_1(o_1)$-axis (i.e. Y-axis of the machine tool) for an angle $\phi_1$, the cutter edge EN rotates around $k_2$ ($o_2$)-axis of the imaginary gear (i.e. rotates around $o_2$) for angle $\phi_2$. Let $$i_t = \frac{\varphi_1}{\varphi_2},$$

the plane enveloping motion between the imaginary gear and the worm can be realized. This invention connects the rotating cutter head with the coordinate system $\Sigma_3$ and makes the workpiece rotate around $j_1(o_1)$ for angle $\phi_1$, the cutter head rotates around its own center $o_3$ for angle $\phi_3$, at the same time $o_3$ rotate around the center $o_2$ of the imaginary gear for an angle $\tau$. The cutter edge EN passes through point N, N is the end point of circular arc at the tooth root of the worm. Each cutting edge comes into cutting at point N and secedes from cutting at point S. The motion of the machine tool can compound the five-axis simultaneous working forming motion for cutting the threads of the worm by using the cutter edge 1 to substitute for EN through controlling the rotating angle $\phi_1$ of the workpiece, the rotating angle $\phi_2$ of the imaginary gear and the rotating angle $\phi_3$ of the cutter head around its own axis as well as the rotating angle $\tau$ of the cutter head around $j_2(o_2)$-axis. FIGS. 8(2) and 8(3) show the motion state of the cutting edge EN under the condition of that the cutter head makes up or down shift along $o_2o_5$ for the distance h (h<0 or h>0).

Figure 9:
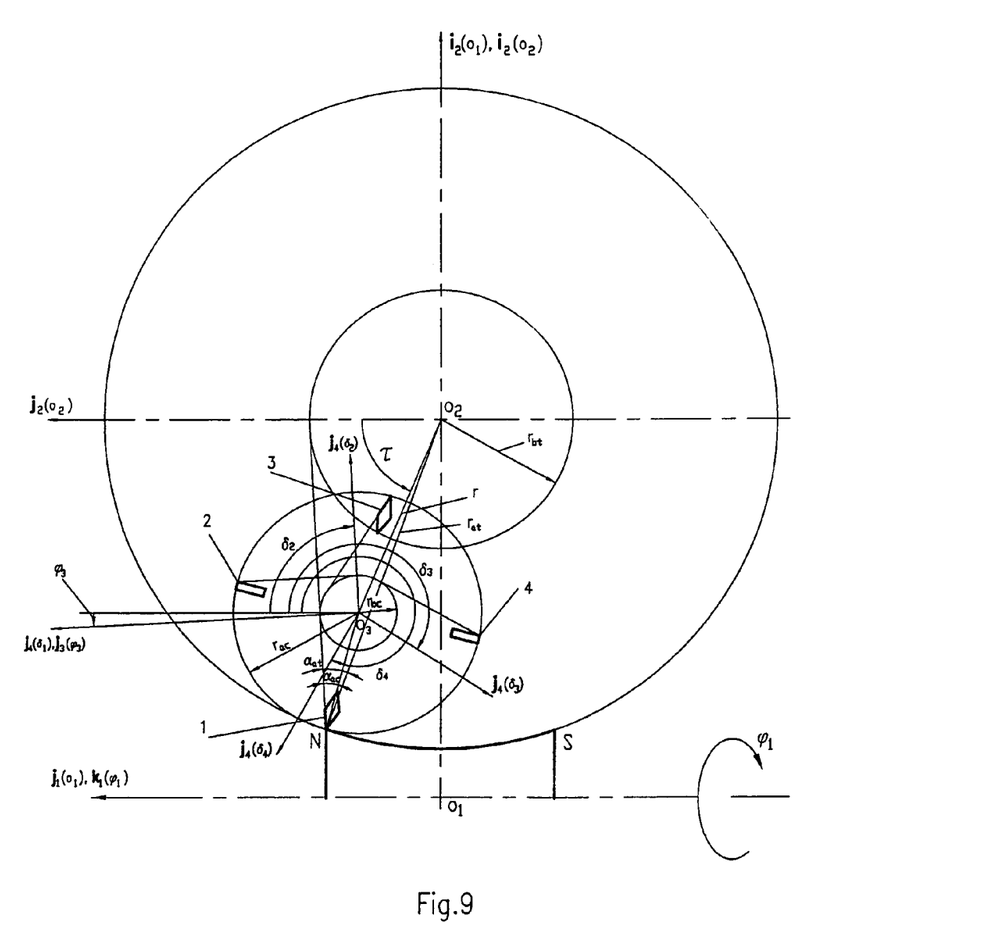
FIG. 9 demonstrates the motion state of the cutter head in the plane of $i_2$ ($o_2$)-axis and $j_2$ ($o_2$)-axis.

FIG. 9 shows the positions of the cutting edges of four blades on the cutter head. The cutting edges 2 and 4 are two blades for cutting the flanks of the thread. The more blades are, the higher the cutting productivity is. The coordinate system $\Sigma4:\{o_3;i_4(\delta), j_4(\delta), k_4(\delta)\}$ is related to the cutting edges, where $o_3$ is congruent to $o_4$ (i.e. $o_3$ is $o_4$), while $\delta_2,\delta_3, \delta_4$ are respectively the rotating angles of the coordinate system $\Sigma$, fixed with the cutting edges 2, 3, and 4 relatively to the coordinate system $\Sigma_3$. The cutting edges 2 and 4 are used for cutting the tooth depth.

Based upon the motion principle of the existing CNC-controlled toroidal worm grinding machines, this invention can once form the tooth flank of plane enveloping toroidal worms by using the above embodiment in accordance with the present invention and makes the tooth profile of the machined toroidal worms identical with that of the ground worms by toroidal worm grinding machines as mentioned above in the Patent No. ZL 92204765.0. In this case it can greatly improve the productivity. If grinding a worm, it will take one hour from fine blank to finish formed step; while cutting a worm, it will take 10 minutes only from fine blank to formed step. If tooth-grinding process combines with the present invention, taking tooth cutting as the rough machining of the worms, and then using tooth grinding for improving the surface roughness of the worms, it will greatly raise the productivity. Under the condition of high-speed cutting, the rotating speed of cutter shaft and workpiece shaft can make the cutting velocity up to 200 m/min, thus the working efficiency is six to seven times higher than that of worm grinding. The machine tool of this invention is to overcome the deficiency of toroidal worm grinding machines and to provide a sort of high-productivity tooth cutting machine tools.

Although the preferred embodiment of the present invention has been described above, this invention is not limited to the particular structures and features described in detail herein. It will be apparent to those skilled in the art that numerous modification form part of the invention insofar as they do not depart from the scope of the appended claims.

What is claimed is:

1. A five-simultaneously-working-axis computerized numerical controlled tooth cutting machine tool for cutting a toroidal worm on a workpiece, comprising: a body of the machine tool and a controlling cabinet, the body including a bed, a spindle box with a spindle, a longitudinal sliding table, a traverse slider, a vertical guideway mounted on the traverse slider, and a tailstock; wherein a cutter rest that supports a rotating cutter head is mounted on the vertical guideway; wherein the spindle rotates about an A-axis thereof, the table longitudinally slides along a Y-axis relative to the bed; wherein the cutter head rotates about a B-axis thereof and transversely shifts along an X-axis, as well as the cutter head makes an up or down shift along a Z-axis of the vertical guideway; the controlling cabinet being equipped with programs for controlling the five axes of A, Y, X, Z and B simultaneously working together; wherein a first coordinate system is associated with the workpiece worm, a second coordinate system is associated with an imaginary gear which meshes with the workpiece worm, a third coordinate system is associated with the rotating cutter head and a fourth coordinate system is associated with the cutting edges which lie on a tooth flank of the imaginary gear, and wherein motion equations of the five axes of the machine tool are determined such that a shift of the cutting edges of the cutter on the cutter head is controlled to simulate a plane which is inclined relative to and rotating around a central axis of the imaginary gear in spatial locations, in order to envelop cut the tooth flanks of a plane enveloping a toroidal worm.

2. The tooth cutting machine tool as recited in claim 1, wherein the inclined plane simulated by the cutting edges of the cutter head rotates around the central axis of the imaginary gear; wherein the combination of both a rotation of the B-axis and a revolution of the B-axis around the central axis of the imaginary gear, at the same time the workpiece rotates around the A-axis, generates in the course of relative motions the tooth flanks of the plane enveloping toroidal worm.

3. The tooth cutting machine tool as recited in claim 2, wherein the cutting edges are all located on two tooth planes of the imaginary gear; wherein two tooth planes are inclined with an angle $\beta$ with respect to the central axis of the imaginary gear and tangential to two imaginary spatial cones, respectively, a half conic angle of the two cones being equal to the inclined angle $\beta$, a radius $r_b$ of a cone base of the imaginary cones being equal to a radius $r_{bt}$ of a main basic circle of the imaginary gear, the cutting edges on the cutter head shift along the tooth plane of the imaginary gear, while the inclined plane is tangential to the spatial cone and rotates around the central axis of the cone, the center $o_2$ of the imaginary gear makes up or down shifts along a vertical axis, the cutting edge begins cutting at point N and terminates cutting at point S, the coordinates of every point on the workpiece makes follow-up motions along the X-, Y- and Z-axis and makes a circular-arc interpolating motion about the B-axis.

4. The tooth cutting machine tool as recited in claim 1, wherein the thread forming motion of the plane enveloping toroidal worm can correctly be controlled by controlling the values of a rotating angle [$\phi_1$], of the workpiece rotating around the A-axis, a rotating angle [$\phi_2$] of the imaginary gear rotating around the axis thereof, a rotating angle [ϕ$_3$] of the cutter head [ϕ$_3$] rotating around the B-axis, an angle τ of the center o$_3$ of the cutter head rotating around the center o$_2$ of the imaginary gear and a distance h of the center o$_2$ of the imaginary gear making a straight-line shift along the central axis thereof to point o$_5$, wherein ϕ$_1$/ϕ$_2$ is equal to the gear ratio between the toroidal worm and the imaginary gear.

5. The tooth cutting machine tool as recited in claim 4, wherein in accordance with a center distance a$_t$ between the imaginary gear and the workpiece, the coordinates of the radius vector r from a center o$_2$ of the imaginary gear to the rotating center of the cutter head, polar angle τ and the values of the pressure angles α$_{at}$, α$_{ac}$ at the tip circles of the imaginary gear and the cutter head, respectively, as well as the given coordinates x, y and z of the workpiece, the motion coordinates of the rotating center o$_3$ of the cutter head are determined, and the value of ϕ$_3$ is calculated according to the following formulae when the values of x$_1$, y$_1$, z$_1$ at point N and point S of the machined workpiece are given, and when the cutting edge begins cutting at point N and terminates cutting at point S:

$$\varphi_{3N} = \arctan\left(\frac{a_t - x_1(N)}{y_1(N)}\right) - (90° - \alpha_{at})$$

$$\varphi_{3S} = \arctan\left(\frac{a_t - x_1(S)}{y_1(S)}\right) + (90° + \alpha_{at})$$

whereby:

ϕ$_{3N}$ and ϕ$_{3S}$=the values of the rotating angle ϕ$_3$ of the cutter head at points N and S, respectively;

a$_t$=the center distance between the imaginary gear and the workpiece;

α$_{at}$=the pressure angle of the tip circle of the imaginary gear;

x$_{1N}$ and x$_{1S}$=the values of the coordinate x$_1$ at points N and S respectively in the first coordinate system Σ$_1$;

y$_{1N}$ and y$_{1S}$=the values of the coordinate y$_1$ at points N and S respectively in the first coordinate system Σ$_1$.

6. The tooth cutting machine tool as recited in claim 5, wherein the center o$_3$ of the rotating cutter head, rotating around the center o$_2$ of the imaginary gear, makes a spatial motion and cuts the thread of tooth flanks of the worm; wherein coordinate equations for the center o$_3$ of the rotating cutter head, representing in coordinate system O$_1$ Σ$_1$ are given by:

$$\left.\begin{array}{l}x_1(o_3) = a_t - r\sin\tau \\ y_1(o_3) = r\cos\tau \\ z_1(o_3) = h\end{array}\right\};\qquad\text{formula (1)}$$

whereby, x$_1$(o$_3$), y$_1$(o$_3$), z$_1$(o$_3$) represent the coordinates of the center o$_3$ of the cutter head;

a$_t$=the center distance between the imaginary gear and workpiece;

r=the radius vector from the center o$_3$ of the cutter head to the center o$_2$ (o$_5$) of the imaginary gear;

h=the distance of vertical shift from the center o$_2$ of the imaginary gear to o$_5$, which value can be h=0, h>0 and h<0;

τ=the included angle τ between the radius vector r and the coordinate axis j$_2$(O$_2$);

$$r = \sqrt{r_{at}^2 + r_{ac}^2 - 2r_{at}r_{ac}\cos(\alpha_{at} - \alpha_{ac})}\qquad\text{formula (2);}$$

whereby, r$_{ac}$=the radius of the tip circle of the rotating cutter head;

r$_{at}$=the radius of the outer circle of the imaginary gear, namely the connected line between points o$_2$ and N;

r$_{ac}$, r$_{at}$ and r are the length of three sides of the triangle o$_2$o$_3$N, respectively; and $$\tau = \phi_3 + 90° - \alpha_{at} - \eta\qquad\text{formula (3);}$$

the pressure angle at the tip circle of the imaginary gear as given by:

$$\alpha_{at} = \arcsin\left(\frac{r_{bt}}{r_{at}}\right);\qquad\text{formula (4)}$$

whereby, r$_{bt}$=the radius of the basic circle of the imaginary gear;

the pressure angle at the tip circle of the rotating cutter head is given by:

$$\alpha_{ac} = \arcsin\left(\frac{r_{bc}}{r_{ac}}\right);\qquad\text{formula (5)}$$

whereby, r$_{bc}$=the radius of the basic circle of the rotating cutter head; and $$\eta = \arcsin\left(\frac{\sin(\alpha_{at} - \alpha_{ac}) \times r_{ac}}{r}\right);\qquad\text{formula (6)}$$

whereby, r$_{ac}$=the radius of the tip circle of the rotating cutter head.

7. The tooth cutting machine tool as recited in claim 1, wherein there are at least two blades mounted on the rotating cutter head, wherein the cutting edges of the blades are on a straight line which lies on a plane perpendicular to the axis of the rotating cutter head, wherein (1) a cutting edge cuts the right flank of the worm while (2) a cutting edge machines the left flank of the same tooth of the worm.

8. The tooth cutting machine tool as recited in claim 1, wherein the spindle box and tailstock are mounted on the bed, the longitudinal sliding table is movably mounted on the bed and the traverse slider is mounted on the longitudinal sliding table.

9. The tooth cutting machine tool as recited in claim 1, wherein the longitudinal sliding table is movably mounted on the bed with the spindle and the tailstock adjustably fixed on the sliding table, and wherein the traverse slider is mounted on the bed.

* * * * *